United States Patent
Yokoyama

(10) Patent No.: US 8,582,447 B2
(45) Date of Patent: Nov. 12, 2013

(54) LOOPBACK DEVICE AND MIRRORING METHOD

(75) Inventor: Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 12/510,492

(22) Filed: Jul. 28, 2009

(65) Prior Publication Data

US 2010/0091665 A1 Apr. 15, 2010

(30) Foreign Application Priority Data

Oct. 14, 2008 (JP) .................................. 2008-265217

(51) Int. Cl.
H04L 12/26 (2006.01)
(52) U.S. Cl.
USPC .......................................... 370/249; 370/292
(58) Field of Classification Search
USPC ............................ 370/249, 252, 389, 392, 401
See application file for complete search history.

(56) References Cited

U.S. PATENT DOCUMENTS

| | | | |
|---|---|---|---|
| 7,152,185 B2 * | 12/2006 | Srivastava et al. | 714/24 |
| 7,408,883 B2 * | 8/2008 | Deragon et al. | 370/249 |
| 2002/0152304 A1 | 10/2002 | Collazo | |
| 2003/0036886 A1 | 2/2003 | Stone | |
| 2003/0115368 A1 * | 6/2003 | Wu | 709/251 |
| 2004/0078483 A1 * | 4/2004 | Simila et al. | 709/238 |
| 2005/0289231 A1 | 12/2005 | Harada | |
| 2008/0013534 A1 * | 1/2008 | Tsuzuki et al. | 370/389 |
| 2009/0296588 A1 * | 12/2009 | Nishi et al. | 370/242 |

FOREIGN PATENT DOCUMENTS

JP 2006-11683 1/2006

OTHER PUBLICATIONS

Search Report, mailed Oct. 27, 2009, in corresponding British Application No. GB0913307.5 (4 pp.).
Japanese Notice of Reason for Rejection issued Nov. 8, 2012 in corresponding Japanese Patent Application No. 2008-265217.
Japanese Notice of Reason for Rejection issued Nov. 13, 2012 in corresponding Japanese Patent Application No. 2008-265217.

* cited by examiner

*Primary Examiner* — Ricky Ngo
*Assistant Examiner* — Christine Ng
(74) *Attorney, Agent, or Firm* — Staas & Halsey LLP

(57) ABSTRACT

A transmission destination of a packet to be transmitted by a web server (11) and an application server (21) incorporated in the same machine (30) is set to a loopback device (50). When a packet is received from one of the servers (11 and 21), the loopback device (50) decides whether or not a combination of a source IP address, a source port number, and a destination port number in the packet is known. If the combination is known, the source IP address and a destination IP address of the received packet are exchanged, and the packet is transmitted to the other server. Further, the packet received from the one of the servers and the packet transmitted to the one of the servers are copied, and the copied packets are transmitted to a communication state visualizing machine (90).

8 Claims, 15 Drawing Sheets

FIG. 6

55 CONNECTION TABLE

| SOURCE IP ADDRESS | SOURCE PORT NO. | DESTINATION PORT NO. |
|---|---|---|
| 192.168.0.1 | 50000 | 1000 |
| 192.168.0.1 | 50010 | 1000 |
| 192.168.0.2 | 40000 | 1000 |
| ... | ... | ... |

FIG. 12

| | SOURCE IP ADDRESS | DESTINATION IP ADDRESS | SOURCE PORT NO. | DESTINATION PORT NO. |
|---|---|---|---|---|
| (A) | 192.168.0.1 | 192.168.1.1 | 50000 | 1000 |
| (B) | 192.168.1.1 | 192.168.0.1 | 50000 | 1000 |
| (C) | 192.168.0.1 | 192.168.1.1 | 1000 | 50000 |
| (D) | 192.168.1.1 | 192.168.0.1 | 1000 | 50000 |

EXCHANGE (A)→(B)
EXCHANGE (C)→(D)

LOOPBACK DEVICE AND MIRRORING METHOD

CROSS-REFERENCE TO RELATED APPLICATION

The disclosure of Japanese Patent Application No. JP2008-265217 filed on Oct. 14, 2008 including the specification, claims, drawings and abstract is incorporated herein by reference in its entirety.

FIELD

The disclosures made herein relate to a technique of mirroring packets.

BACKGROUND

As is well known, there is software that visualizes communication states between a plurality of computers connected via the Internet protocol (IP) network. The computer that has obtained the communication state visualization function by the activation of this software receives a copy of packets flowing between the plurality of computers to be monitored and displays contents of the received packets as they are. In addition, the computer that has obtained the communication state visualization function displays information about a protocol and an address described in the packet after converting the information into a form that users can understand easily, or extracts and performs a statistical process on packets that satisfy a specific condition so as to display a chart or a graph thereof. In addition, the computer that has obtained the communication state visualization function may display a ladder diagram of a sequence of establishing a transmission control protocol (TCP) connection and communication of messages based on the received packet. Here, the message is reproduced by reconstructing segments remaining after an IP header and a TCP header are removed, and means a transmission unit on a communication layer on the upper level of the TCP.

The reception of the copy of packets flowing between the plurality of computers to be monitored is usually realized by a port mirroring function of a local area network (LAN) switch. The port mirroring function is a function of copying packets passing through a specific communication port so as to send out the copy from a mirror port. The computer in which the software described above has been installed is connected to the mirror port of the LAN switch to which all of the plurality of computers to be monitored are connected.

For instance, as illustrated in FIG. 13, an application server 21 that performs a business logic to which transaction management, session management, data processing, and the like are applied is disposed between a web server 11 and a database server 41 of a web three-tier system. In this web three-tier system, if the web server 11, the application server 21, and the database server 41 are incorporated in different machines 10, 20, and 40, respectively, a relay device (not shown) in an external network and a first network interface card (NIC) 15a in the web server machine 10 are connected to each other via the first LAN switch 60, a second NIC 15b in the web server machine 10 and a first NIC 25a in the application server machine 20 are connected to each other via the second LAN switch 70, and a second NIC 25b in the application server machine 20 and a NIC 40a in the database server machine 40 are connected to each other via the third LAN switch 80.

In the example illustrated in FIG. 13, when a hypertext transfer protocol (HTTP) interface (I/F) and the NIC on the lower level of the web client (not shown) communicate an HTTP message with an HTTP interface 12a and a first NIC 15a on the lower level of the web server 11, the first LAN switch 60 relays the packets that is fragments of the HTTP message. In addition, the first LAN switch 60 copies the relayed packet and transmits the copy to a communication state visualization function 91 in a machine 90 whose NIC 90a is connected to its own mirror port.

When an Internet inter-ORB protocol (IIOP) (a trademark of an object management group) interface 12b and the second NIC 15b on the lower level of the web server 11 communicate an IIOP message with an IIOP interface 22a and first NIC 25a on the lower level of the application server 21, the second LAN switch 70 relays the packets that are fragments of the IIOP message. In addition, the second LAN switch 70 copies the relayed packets and transmits the copy to the communication state visualization function 91 in the machine 90 whose NIC 90a is connected to its own mirror port.

When a structured query language (SQL) interface 22b and a second NIC 25b on the lower level of the application server 21 communicate a SQL message with a SQL interface 42 and the NIC 40a on the lower level of the database server 41, the third LAN switch 80 relays the packets that are fragments of the SQL message. In addition, the third LAN switch 80 copies the relayed packets and transmits the copy to the communication state visualization function 91 in the machine 90 whose NIC 90a is connected to its own mirror port.

Then, the communication state visualization function 91 illustrated in FIG. 13 receives packets from the first to the third LAN switches 60 to 80, and reconstructs the HTTP message, the IIOP message, and the SQL message based on the received packets so as to display the ladder diagram of communications of the messages as illustrated in FIG. 14.

In the ladder diagram, time bases of a web client machine (not shown), the web server machine 10, the application server machine 20, and the database server machine 40 are displayed in parallel. Then, an arrow indicating one message transmission is drawn from the time base of the machine that has sent the message to the time base of the machine as the destination. The arrows indicating the HTTP message, the IIOP message, and the SQL message are drawn so that a sequence of communications of messages (transactions) in response to a request from the web client machine.

Further, for example, an interval between end points of the arrows on the time base of the web server machine 10 clearly indicates a period of time Ta (seconds) from the time point when the HTTP message is received to the time point when the IIOP message is transmitted. In addition, for example, an interval between end points of the arrows on the time base of the application server machine 20 clearly indicates a period of time Tb (seconds) from the time point when the IIOP message is received to the time point when the SQL message is transmitted. Thus, a server machine that has been processing for a long period of time can be found.

The following is a related art to the invention.
[Patent document 1] Japanese Patent Laid-Open Publication No. JP 2006-011683

SUMMARY

In the web three-tier system illustrated in FIG. 13, the web server 11, the application server 21, and the database server 41 are incorporated in different machines, respectively. However, in reality, the web three-tier system is often constituted as a middle- or small-scale system. In this case, the web server 11 and the application server 21, in particular, are often incorporated in the same machine 30 as illustrated in FIG. 15.

In the example illustrated in FIG. 15, the IIOP interface 12*b* on the lower level of the web server 11 and the IIOP interface 22*a* on the lower level of the application server 21 communicate the IIOP message locally in the same machine 30, so that the second LAN switch 70 is eliminated. Then, the packet carrying the IIOP message is not mirrored, and hence the reconstruction of the IIOP message is not performed by the communication state visualization function 91. As a result, the communication state visualization function 91 reconstructs the HTTP message and the SQL message based on the packets received from the first and the third LAN switches 60 and 80, and displays the ladder diagram of communications of the messages as illustrated in FIG. 16.

In the ladder diagram of this example, only one time base of the web application server machine 30 is illustrated in which the web server 11 and the application server 21 are incorporated. Further, an interval between end points of the arrows on the time base of the web application server machine 30 clearly indicates, for example, a period of time Tc from the time point when the HTTP message is received to the time point when the SQL message is transmitted.

This period of time Tc is a total sum of the period of time Ta and the period of time Tb illustrated in FIG. 14. It is unknown from the period of time Tc which one of the period of time Ta and the period of time Tb is longer. Therefore, there has been a problem that it is impossible to know which one of the web server 11 and the application server 21 takes long time for processing when the period of time Tc is long.

According to an aspect of the disclosures made herein, both connection destinations of the pair of servers that belong to neighboring layers and are incorporated in the same machine among a plurality of servers constituting the multi-tier system are set to be a loopback device connected to the machine. The loopback device stores a source address, a source port number, and a destination port number associated with each other in a storage unit. In addition, when a packet is received from one of the pair of servers incorporated in the machine, the loopback device reads a source address, a source port number, and a destination port number from the packet. If the same combination of the read source address, the read source port number, and the read destination port number is stored in the storage unit, the source address and the destination address of the received packet are exchanged and the packet with the exchanged addresses is transmitted to the other server in the machine. In addition, the loopback device copies the packet received from the one of the servers and the packet transmitted to the one of the servers, and transmits the copies to a communication state visualizing machine.

The objects and advantages of the invention will be realized and attained by means of the elements and combinations particularly pointed out in the claims.

BRIEF DESCRIPTION OF THE DRAWINGS

FIG. 6 is a diagram schematically illustrating a connection table;

FIG. 12 is a table illustrating an IP address and a port number of each packet communicated in an uplink transmission or in a downlink transmission;

DESCRIPTION OF EMBODIMENTS

Figure 1:
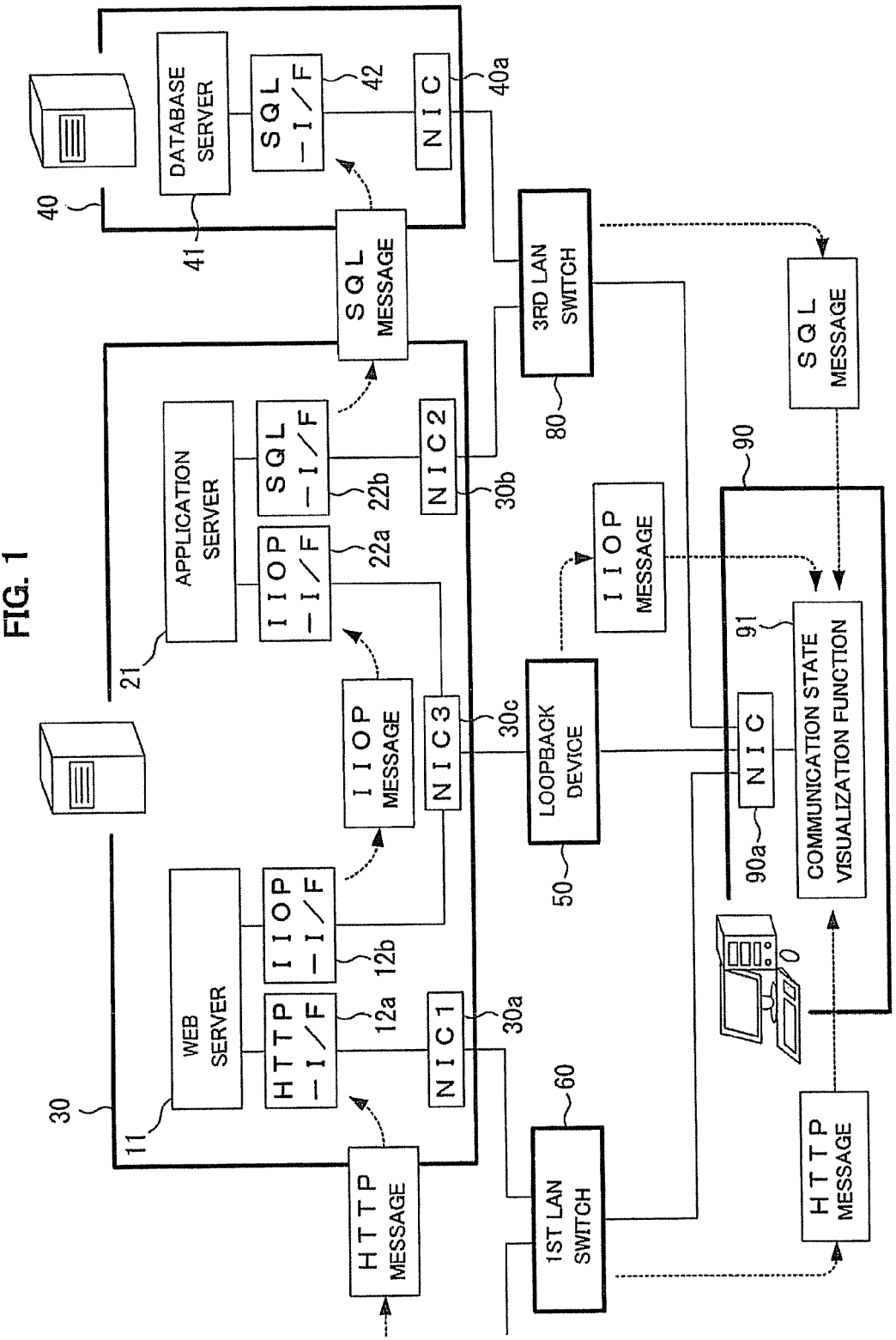
FIG. 1 is a block diagram illustrating a configuration of a computer network system according to this embodiment.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

Hereinafter, a computer network system as an embodiment of the mirroring method disclosed above is described with reference to the attached drawings.

Note that the computer network system described below is merely an embodiment, and the mirroring method disclosed above is not limited to the configuration described below.

[Configuration]

Figure 13:
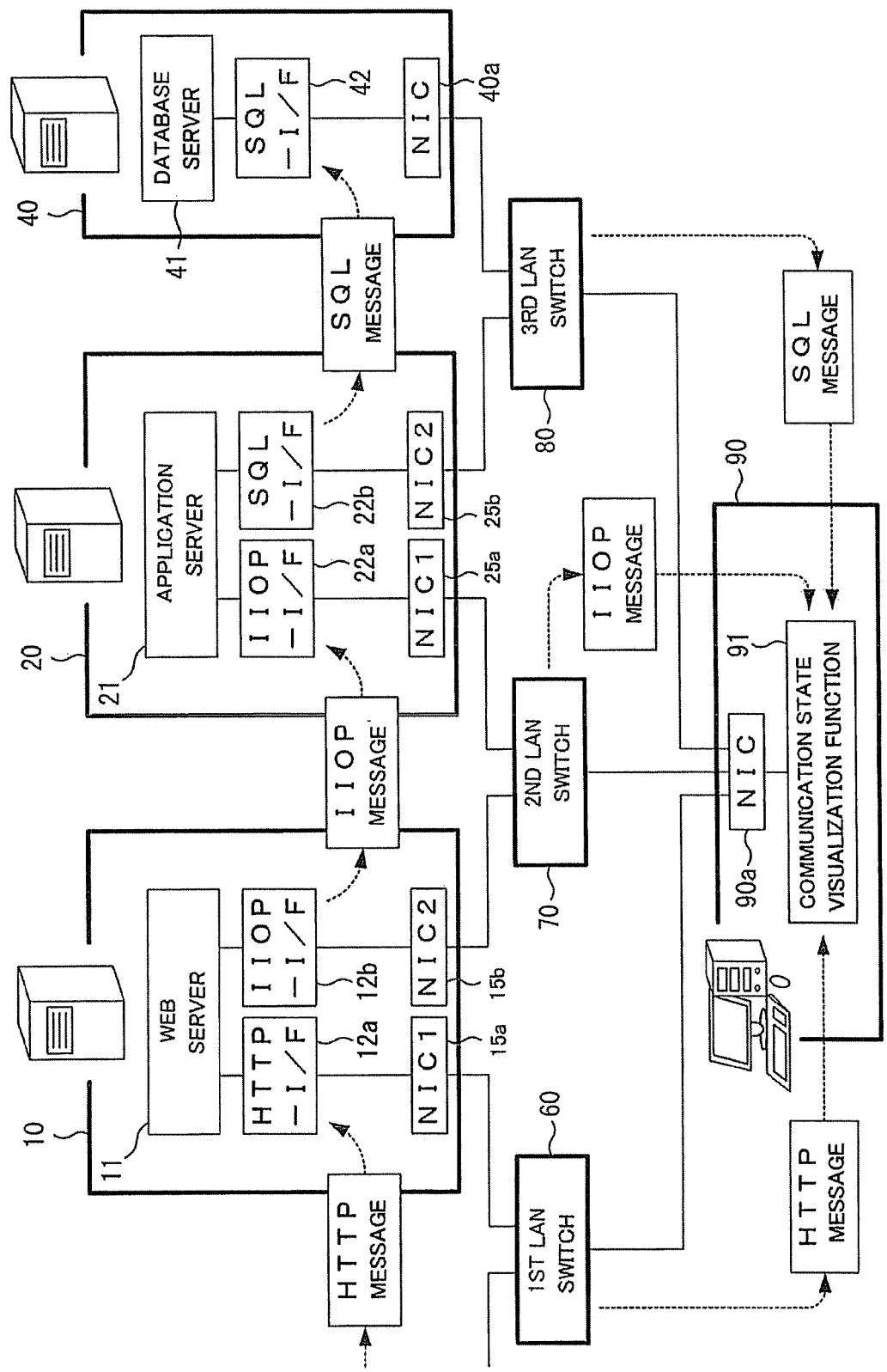
FIG. 13 is a diagram illustrating a configuration of a conventional web three-tier system having three servers incorporated in different machines.
Figure 14:
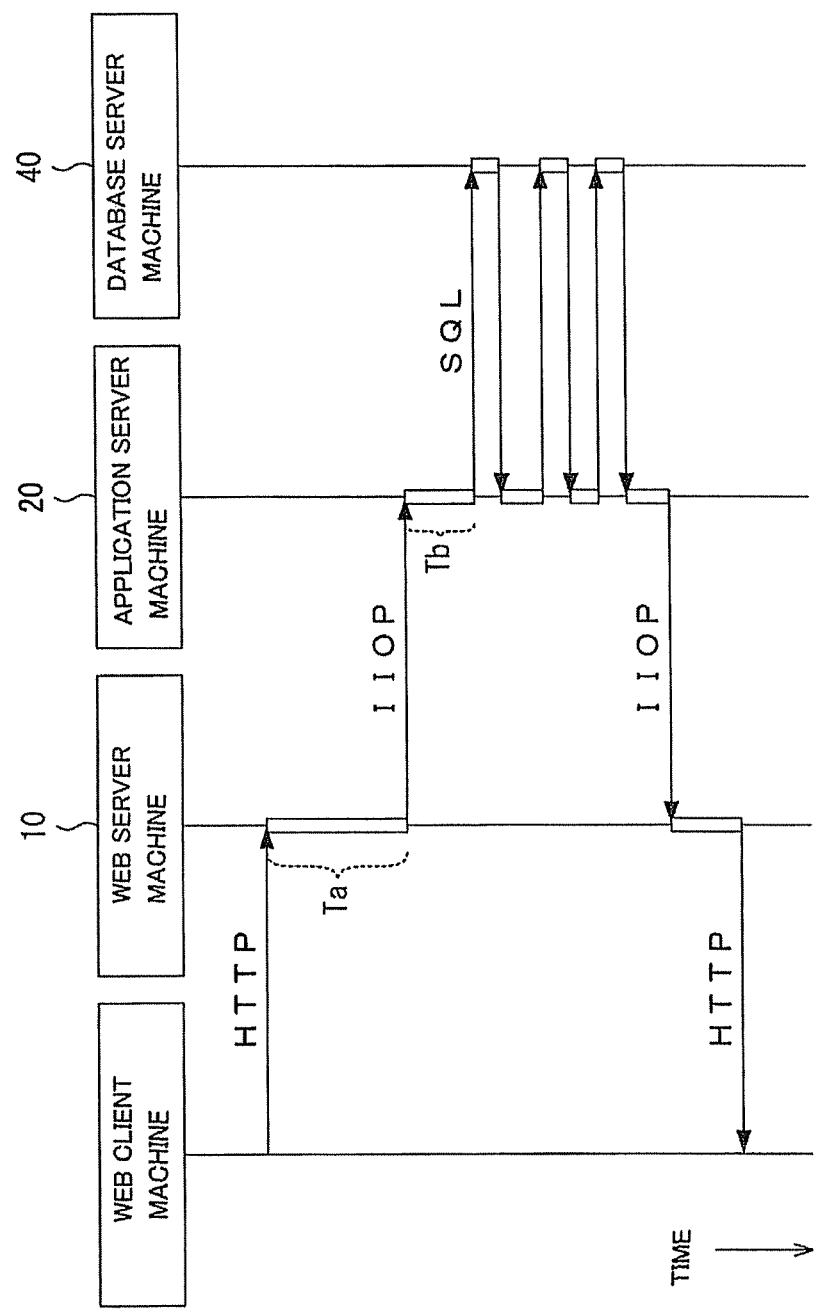
FIG. 14 is a diagram illustrating ladder display of messages communicated among three machines.
Figure 15:
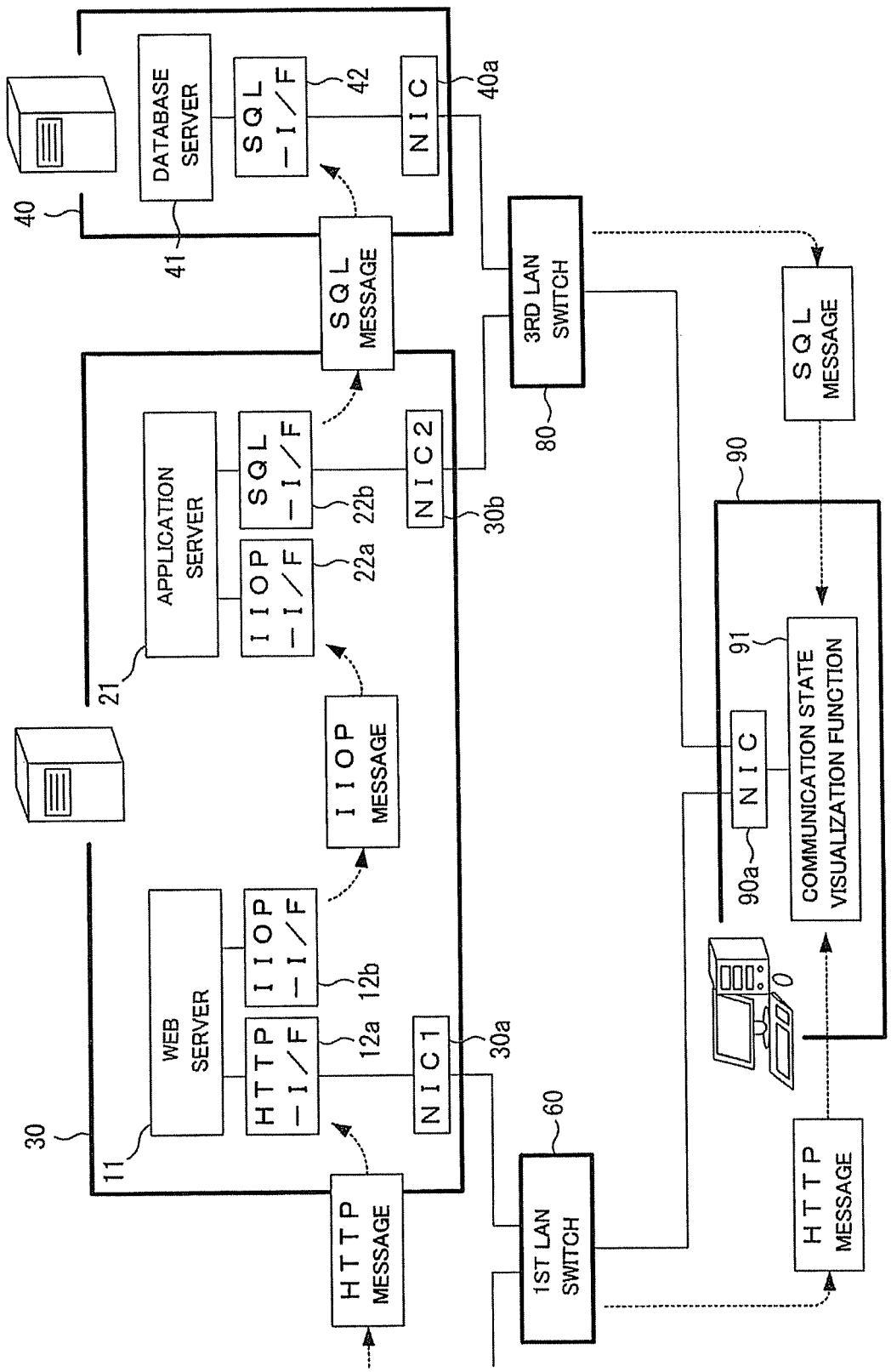
FIG. 15 is a diagram illustrating a configuration of a conventional web three-tier system in which two servers among three servers are incorporated in the same machine.
Figure 16:
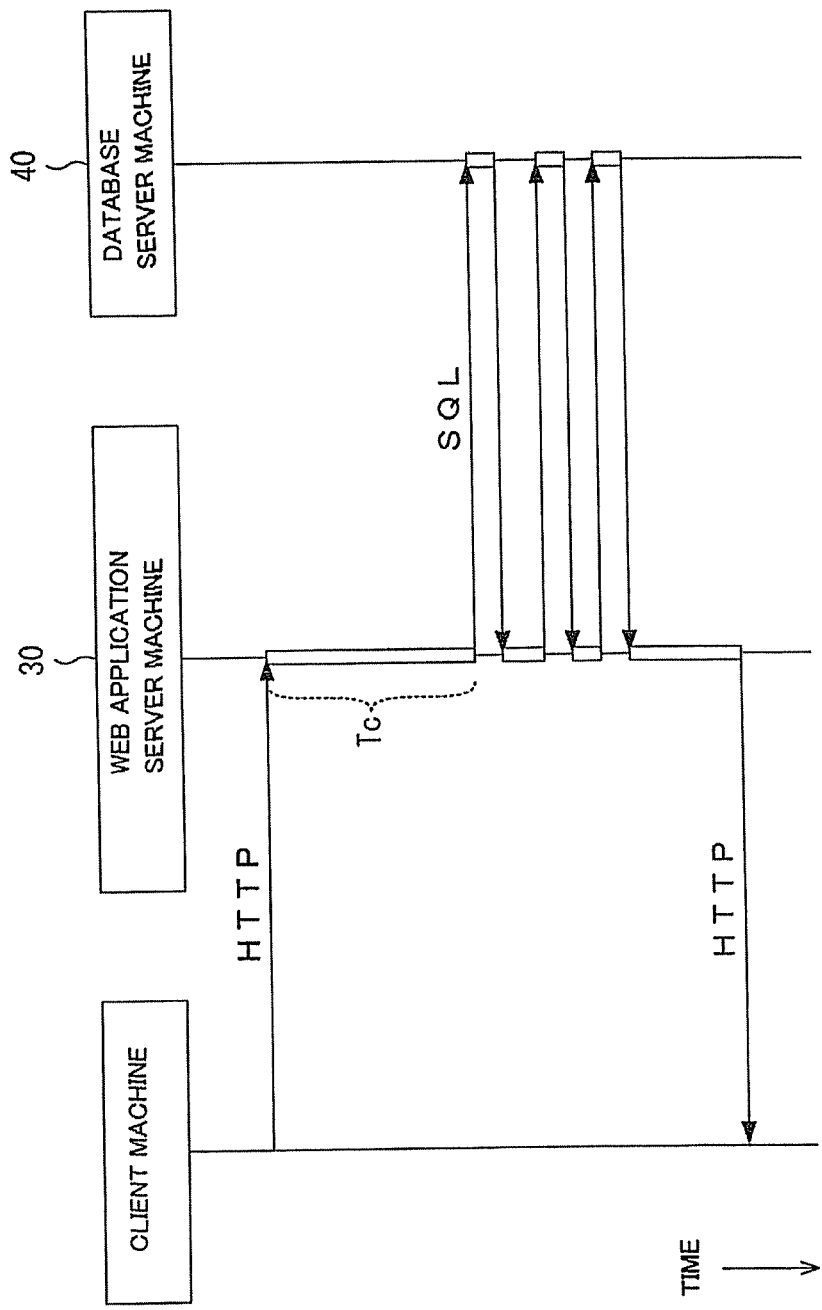
FIG. 16 is a diagram illustrating ladder display of messages communicated between two machines.

FIG. 1 is a block diagram illustrating a configuration of the computer network system according to this embodiment. Note that the same elements as those of FIGS. 13 and 15 are denoted by the same reference numerals in the FIG. 1.

The computer system of this embodiment includes a web three-tier system. The web three-tier system includes an application server 21 between a web server 11 and a database server 41.

Among those, the web server 11 performs a service of transmitting data requested from a web client. The database server 41 stores data in a retrievable manner and performs a search for the data.

The application server 21 performs a business logic to which transaction management, session management, data processing, and the like are applied. The application server 21 performs business logic designated by the web client via the web server 11 and returns a performance result thereof to the web client via the web server 11. In addition, the application server 21 requests the database server 41 for a search and obtains a search result thereof if required in the performing process of the business logic.

As illustrated in FIG. 1, according to this embodiment, the web server 11 and the application server 21 are incorporated in the same machine 30. In contrast, the database server 41 is incorporated in a machine 40 that is different from the machine 30.

Those machines 30 and 40 are typical computers. Therefore, each of those machines 30 and 40 includes at least a communication unit, a storage unit, a central processing unit (CPU), and a main memory unit. An operating system is installed in the storage unit. The operating system is software for the CPU to perform intermediacy between software and hardware, management of memory space, management of files, management of processes and tasks, and the like. In addition, the operating system includes a transmission control protocol/internet protocol (TCP/IP) suite. The TCP/IP suite is a program for a logical host assigned with an IP address to communicate packets with another logical host assigned with another IP address in accordance with the TCP/IP.

Software for causing the CPU to work as the database server 41 is installed in the storage unit of the database server machine 40 in which the database server 41 is incorporated. In addition, software for causing the CPU to work as a structured query language (SQL)-interface (I/F) 42 of the lower level of the database server 41 is also installed in the storage unit of the database server machine 40. The SQL-I/F 42 is a program for the server on the upper level of its own software to perform communication of SQL messages with the client, and is a program located on the upper level of the TCP/IP suite. In addition, the database server machine 40 incorporates a network interface card (NIC) 40*a* as a communication unit.

Software for causing the CPU to work as the web server 11 and the application server 21 is installed in the storage unit of the web application server machine 30 in which the web server 11 and the application server 21 are incorporated. In addition, software for causing the CPU to work as a hypertext transfer protocol (HTTP)-I/F 12*a*, internet inter-ORB protocol (IIOP) (a trademark of the object management group)-I/Fs 12*b* and 22*a*, and an SQL-I/F 22*b* is also installed in the storage unit of the web application server machine 30. The HTTP-I/F 12*a* is a program for causing the server on the upper level of its own software to perform communication of HTTP messages with the client. The IIOP-I/Fs 12*b* and 22*a* are programs for the server on the upper level of its own software to perform communication of IIOP messages with another server. In addition, the web application server machine 30 incorporates first to third NICs 30*a* to 30*c* as communication units. Here, the first to the third NICs 30*a* to 30*c* may be three physical NICs each of which has a set logical host or a physical NIC to which three logical hosts are set.

The first NIC 30*a* is connected to a relay device (not shown) in an external network via a first LAN switch 60. In addition, the second NIC 30*b* is connected to the NIC 40*a* in the database server machine 40 via a third LAN switch 80. Further, the third NIC 30*c* is connected to a loopback device 50.

When the HTTP-I/F and the NIC on the lower level of the web client (not shown) communicate the HTTP message with the HTTP-I/F 12*a* and the first NIC 30*a* on the lower level of the web server 11, the first LAN switch 60 relays a fragment of the HTTP message as a packet. In addition, the first LAN switch 60 copies the relayed packet and transmits the copy to a communication state visualization function 91 included in a machine 90 whose mirror port is connected to a NIC 90*a*.

When the SQL-I/F 22*b* and the second NIC 30*b* on the lower level of the application server 21 communicate the SQL message with the SQL-I/F 42 and the NIC 40*a* on the lower level of the database server 41, the third LAN switch 80 relays a fragment of the SQL message as a packet. In addition, the third LAN switch 80 copies the relayed packet and transmits the copy to the communication state visualization function 91 included in the machine 90 whose mirror port is connected to the NIC 90*a*.

When the IIOP-I/F 12*b* on the lower level of the web server 11 communicates the IIOP message with the IIOP-I/F 22*a* on the lower level of the application server 21, the loopback device 50 relays a fragment of the IIOP message as a packet.

Note that the IIOP message is communicated locally in the same machine 30 normally because the web server 11 and the application server 21 are incorporated in the same machine 30. However, in this embodiment, the IIOP message originated from one of the web server 11 and the application server 21 is sent out to the loopback device 50 via the third NIC 30*c* and sent out from the loopback device 50 to the other server via the third NIC 30*c*. Each of the web server 11 and the application server 21 is identified by a combination of the logical host (IP address) and the port number. In this embodiment, the IIOP-I/F 12*b* on the lower level of the web server 11 is assigned with a port number different from that of the IIOP-I/F 22*a* on the lower level of the application server 21. Therefore, even if the web server 11 and the application server 21 use the same third NIC 30*c*, the loopback device 50 can discriminate between the servers 11 and 21.

In addition, the loopback device 50 copies the packet received from one of the web server 11 and the application server 21 and the packet transmitted to one of the servers, and transmits the copies to the communication state visualization function 91 of the machine 90 which is connected to the NIC 90*a*. In other words, the loopback device 50 copies the packet communicated with the web server 11 so as to transmit the copy to the communication state visualization function 91, or copies the packet communicated with the application server 21 and transmits the copy to the communication state visualization function 91. If the copy of the packet communicated with the web server 11 is designated to be transmitted to the communication state visualization function 91 as in the former case, the loopback device 50 looks like the application server 21 to the communication state visualization function 91. On the contrary, if the copy of the packet communicated with the application server 21 is designated to be transmitted to the communication state visualization function 91 as in the latter case, the loopback device 50 looks like the web server 11 to the communication state visualization function 91.

Figure 2:
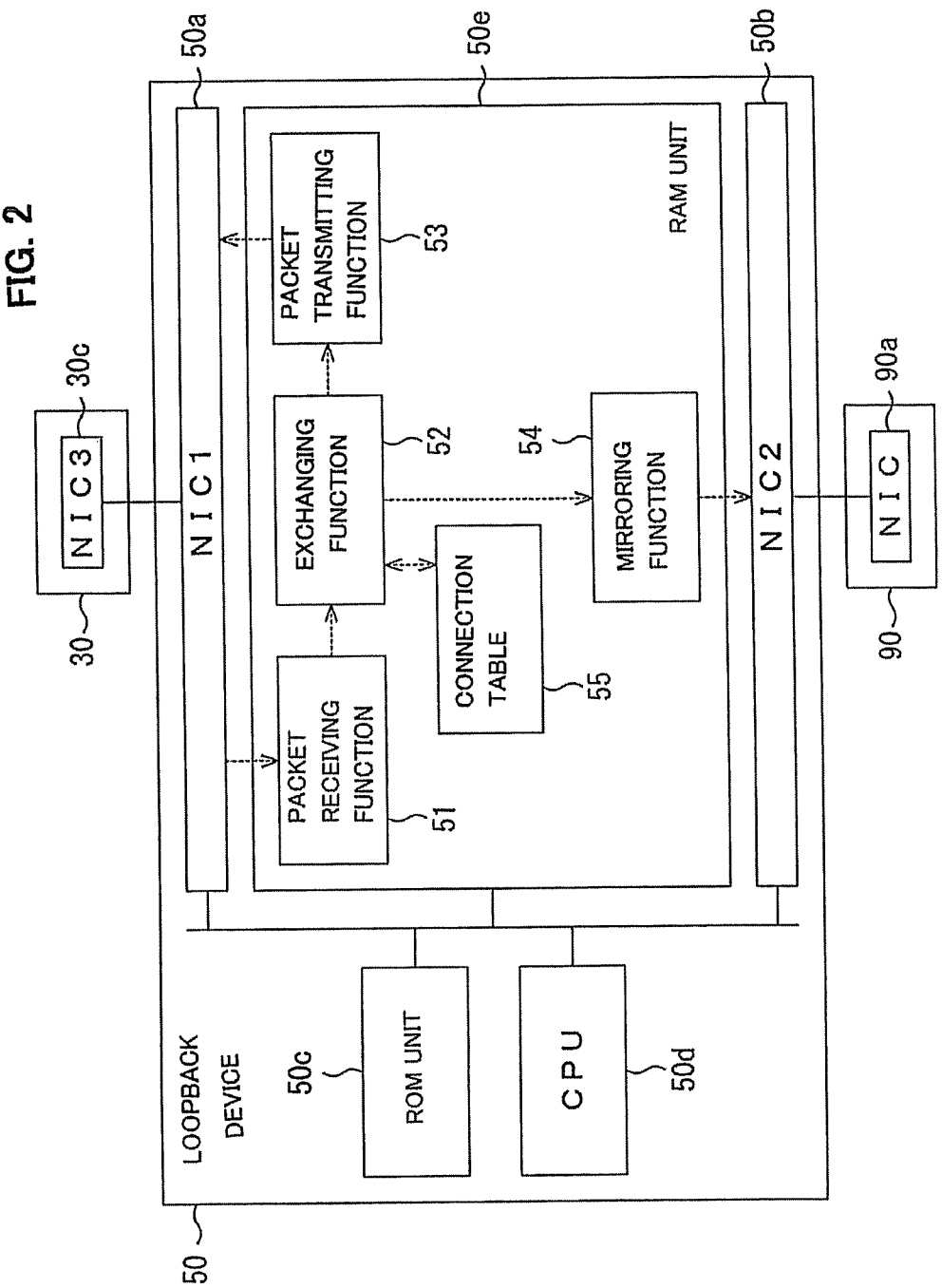
FIG. 2 is a block diagram illustrating a configuration of a loopback device.

FIG. 2 is a block diagram illustrating a configuration of the loopback device 50.

The loopback device 50 includes first and second NICs 50*a* and 50*b*, a read only memory (ROM) unit 50*c*, a CPU 50*d*, and a random access memory (RAM) unit 50*e*. The loopback device 50 stores in the ROM unit 50*c* a plurality of programs for causing the CPU to perform various functions related to this embodiment. FIG. 2 illustrates the state where those programs are developed in the RAM unit 50*e*.

As illustrated in FIG. 2, the CPU of the loopback device 50 concretely realizes a packet receiving function 51, an exchanging function 52, a packet transmitting function 53, and a mirroring function 54.

The packet receiving function 51 is a function of receiving a packet via the first NIC 50*a* from the third NIC 30*c* of the web application server machine 30. The exchanging function 52 is a function of exchanging a source IP address and a destination IP address of the packet received by the packet receiving function 51. The packet transmitting function 53 is a function of transmitting the packet having the source IP address and the destination IP address exchanged by the exchanging function 52 via the first NIC 50*a* to the third NIC 30*c* of the web application server machine 30. The mirroring function 54 is a function of copying the packet before or after the exchanging function 52 exchanges the source IP address with the destination IP address and sending out the copy via the second NIC 50*b* to the NIC 90*a* of the communication state visualizing machine 90.

In addition, the exchanging function 52 monitors connection information including the source IP address, the source port number, and the destination port number of each packet received by the packet receiving function 51. If unknown connection information is read from the packet received by the packet receiving function 51, the exchanging function 52 registers the connection information in a connection table 55. If known connection information is read from the packet received by the packet receiving function 51, the exchanging function 52 exchanges the source IP address with the destination IP address.

Figure 3:
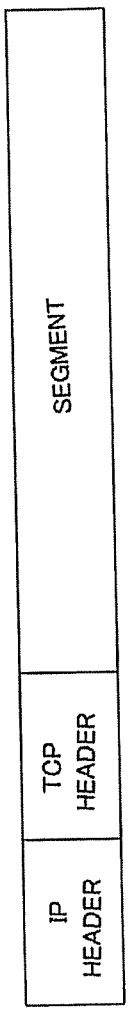
FIG. 3 is a diagram schematically illustrating a packet.

Here, the packet is made up of an IP header, a TCP header, and a segment as illustrated in FIG. 3. The segment is a part obtained by dividing the message by a predetermined transmission unit. Note that the message is divided into segments, and each of the segments is included in the packet and carried from a source to a destination. When each segment arrives at the destination, the message is reconstructed based on the segments.

Figure 4:
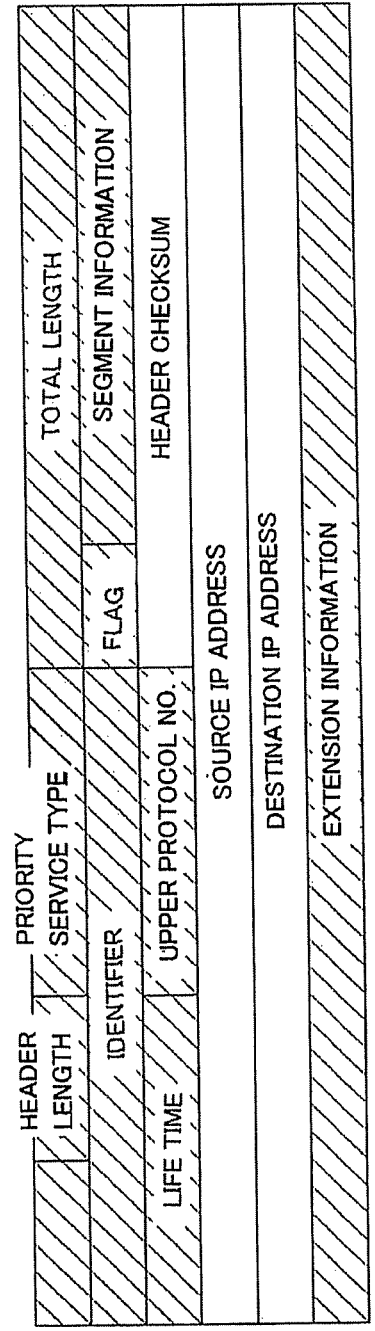
FIG. 4 is a diagram illustrating an IP header format.

In addition, the IP header includes fields of "header checksum", "source IP address", and "destination IP address" as illustrated in a header format diagram of FIG. 4. Note that other fields are hatched in FIG. 4, and description of the hatched fields is omitted because the hatched fields are not used in this embodiment. A checksum of the entire IP header is stored in the "header checksum" field. The checksum is a numeric value that is used for checking a loss of header information during the transmission. Specifically, the IP header in the case where a value of the "header checksum" field is set to be zero is divided into 16 bits each, and a total sum of the 16-bit fragments complement of 1 (value after bit flipping) is obtained. Further, complement of 1 of the total sum is computed so as to obtain the numeric value. The same computation is performed also on the side that has received the packet. If the same numeric value is obtained, it is found that there is no loss in the header information. In addition, an IP address of a logical host to be a source of the packet is stored in the "source IP address" field, and an IP address of a logical host to be a destination of the packet is stored in the "destination IP address" field.

Figure 5:
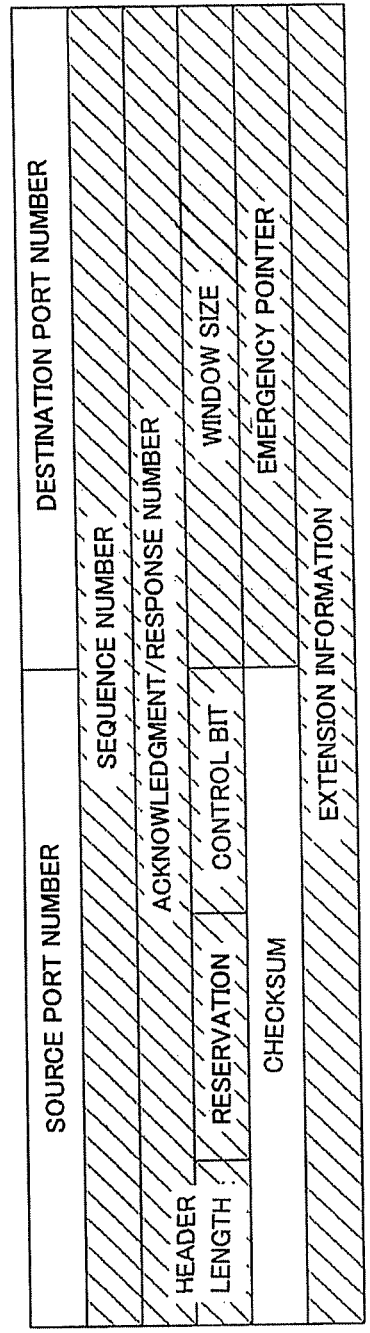
FIG. 5 is a diagram illustrating a TCP header format.

In addition, the TCP header includes fields of "source port number", "destination port number", and "checksum" as illustrated in a header format diagram of FIG. 5. Note that other fields are hatched in FIG. 5, and description of the hatched fields is omitted because the hatched fields are not used in this embodiment. A port number that specifies the communication application (HTTP-I/F 12a, IIOP-I/Fs 12b and 22a, and the like) that has created the message whose segment is carried by the packet is stored in the "source port number" field. A port number that specifies the communication application using the message whose segment is carried by the packet is stored in the "destination port number" field. A checksum of the entire TCP header is stored in the "checksum" field. The method of calculating the checksum is the same as that in the case of the header checksum of the IP header.

FIG. 6 is a diagram that schematically illustrates the connection table 55.

In the connection table 55, a plurality of pieces of connection information described above are recorded. Specifically, a combination of the source IP address, the source port number, and the destination port number is recorded as one record in the connection table 55. Therefore, each record of the connection table 55 has fields of "source IP address", "source port number", and "destination port number", and the fields store the source IP address, the source port number, and the destination port number, respectively.

[Process]

Figure 7:
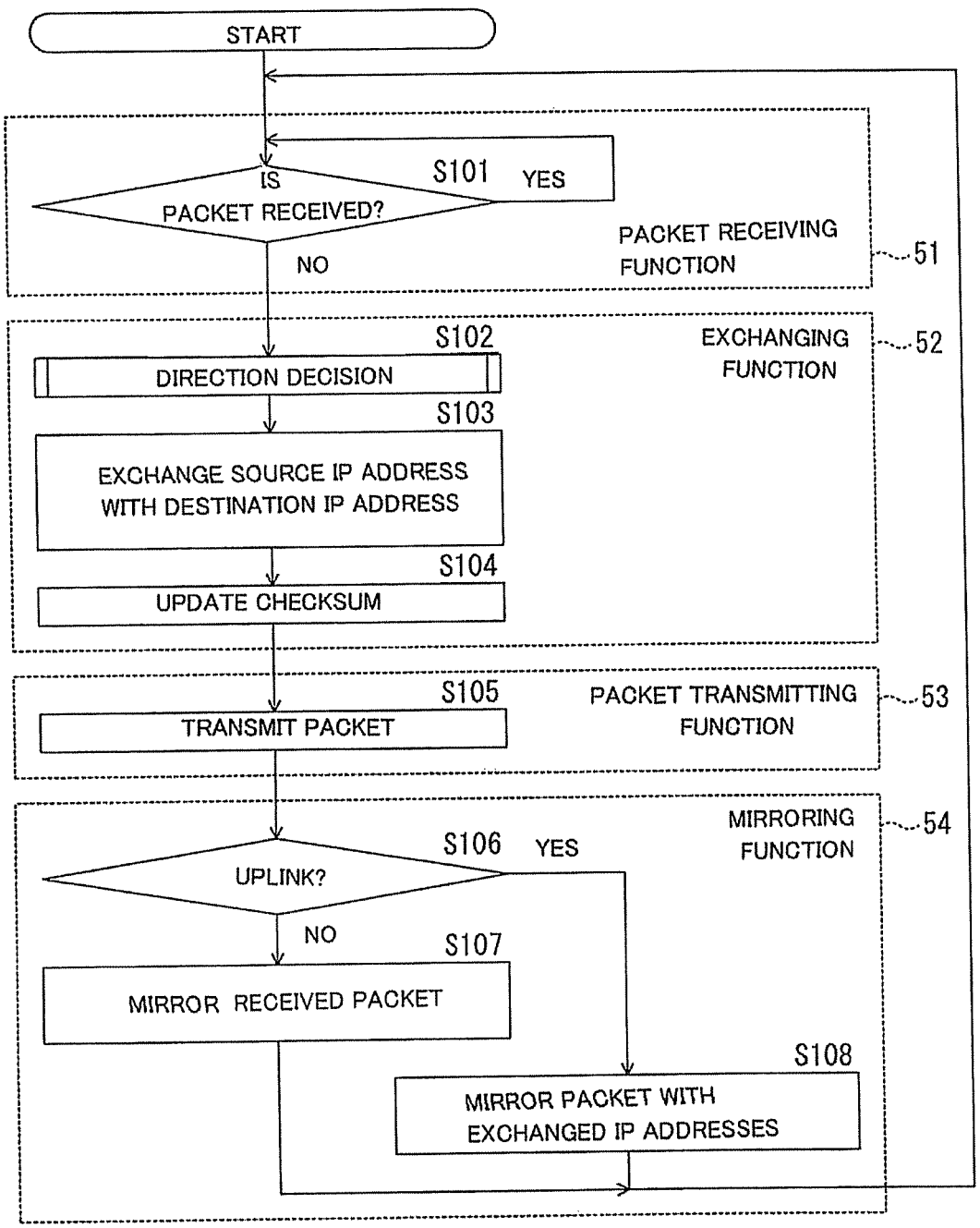
FIG. 7 is a diagram illustrating a flow of a process performed by the loopback device of this embodiment.

FIG. 7 is a diagram illustrating a flow of a process performed by the loopback device 50 of this embodiment.

After the process is started, the process waits for the packet receiving function 51 to receive a packet from a third NIC 30c of the web application server machine 30 via a first NIC 50a (No in Step S101).

Then, if the packet receiving function 51 receives a packet from the third NIC 30c of the web application server machine 30 via the first NIC 50a (Yes in Step S101), the exchanging function 52 calls and executes a direction decision subroutine (Step S102).

Figure 8:
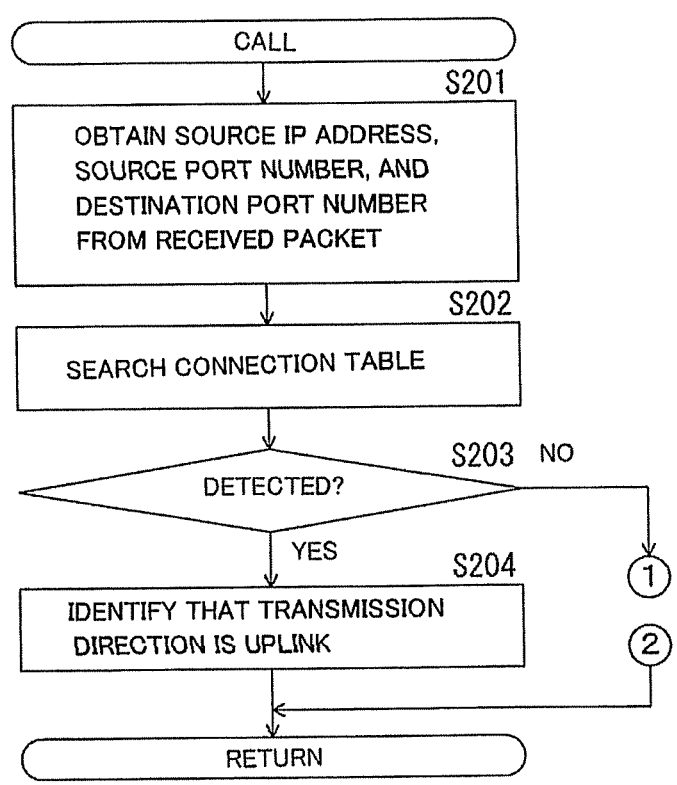
FIG. 8 is a diagram illustrating a flow of a direction decision subroutine.
Figure 9:
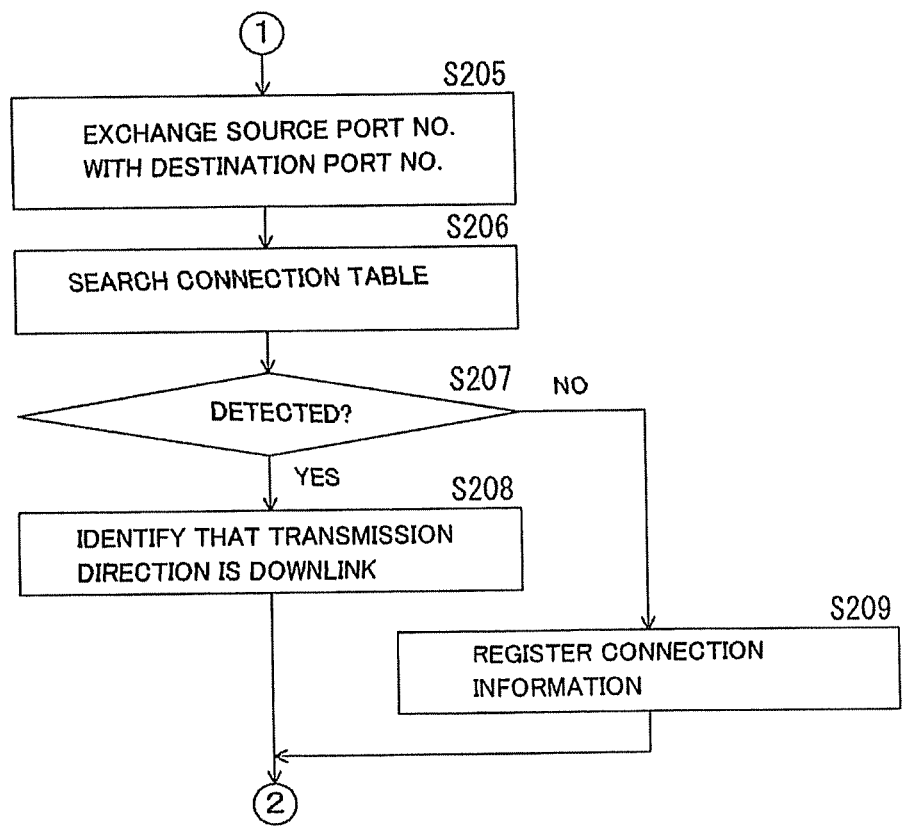
FIG. 9 is a diagram illustrating a flow of the direction decision subroutine.

FIGS. 8 and 9 are diagrams each illustrating a flow of the direction decision subroutine.

After the direction decision subroutine is started, the exchanging function 52 reads the source IP address, the source port number, and the destination port number from the IP header and the TCP header of the packet received by the packet receiving function 51 (Step S201). Note that the destination IP address is assigned to the first NIC 50a of the loopback device 50, and thus is not read out by the exchanging function 52.

Next, the exchanging function 52 searches the connection table 55 of FIG. 6 based on search conditions of the source IP address, the source port number, and the destination port number read out from the received packet (Step S202). In other words, the exchanging function 52 retrieves a record having the source IP address read out from the received packet in the "source IP address" field, the read source port number in the "source port number" field, and the read destination port number in the "destination port number" field. Then, if a record matching the search conditions is found in the connection table 55 (Yes in Step S204), the exchanging function 52 identifies that the transmission direction is uplink and, for example, sets a direction flag to be "uplink". After identifying, the direction decision subroutine according to FIGS. 8 and 9 is finished.

On the contrary, if a record matching the search conditions is not found in the connection table 55 (No in Step S204), the exchanging function 52 exchanges the source port number with the destination port number among the source IP address, the source port number, and the destination port number readout from the received packet (Step S205), and the connection table 55 of FIG. 6 is searched with the source IP address and the exchanged source port number and destination port number as search conditions (Step S206). In other words, the exchanging function 52 retrieves the record having the source IP address read out from the received packet in the "source IP address" field, the read destination port number in the "source port number" field, and the read source port number in the "destination port number" field. Then, if a record matching the search conditions is found in the connection table 55 (Yes in Step S207), the exchanging function 52 identifies that the transmission direction is downlink and, for example, sets the direction flag to be "downlink". After identifying, the direction decision subroutine according to FIGS. 8 and 9 is finished.

On the other hand, if a record matching the search conditions is not found in the connection table 55 (No in Step S207), the exchanging function 52 registers the connection information including the source IP address, the source port number, and the destination port number read out from the received packet in the connection table 55 of FIG. 6 (Step S209). After registering, the direction decision subroutine according to FIGS. 8 and 9 is finished.

When finishing the direction decision subroutine, the exchanging function 52 returns to the main routine and performs a process of exchanging the source IP address and the destination IP address of the packet received by the packet receiving function 51 (Step S103). In other words, the exchanging function 52 writes the destination IP address in the "source IP address" field of the IP header of the received packet and writes the source IP address in the "destination IP address" field of the same IP header. Here, the source IP address is assigned to the third NIC 30c of the web application server machine 30 while the destination IP address is assigned to the first NIC 50a of the loopback device 50. Therefore, the process of exchanging the addresses is performed for simply sending back the packet. However, the source port number and the destination port number in the TCP header are not changed. Therefore, for example, if the received packet is sent from the web server 11, to the application server 21 as the destination, the packet received from the loopback device 50 looks like the packet sent from the web server 11 of the loopback device 50.

Next, the exchanging function 52 updates the header checksum of the IP header (see FIG. 5) of the packet whose source IP address and destination address have been exchanged and updates the checksum of the TCP header (see FIG. 6) of the same packet (Step S104). Note that the checksum is updated because contents of the header are changed.

Next, the packet transmitting function 53 transmits the packet whose source IP address and destination IP address have been exchanged by the exchanging function 52 to the third NIC 30c of the web application server machine 30 via the first NIC 50a (Step S105).

Next, if the transmission direction of the packet identified by the exchanging function 52 in the direction decision subroutine is "uplink" (Yes in Step S106), a mirroring function 54 performs a mirroring process of the packet received by the packet receiving function 51 (Step S107). In other words, the mirroring function 54 copies the packet and sends out the copy to the NIC 90a of the communication state visualizing machine 90 via the second NIC 50b. After sending out, the process becomes the state of waiting for the packet receiving function 51 to receive the packet from the third NIC 30c of the web application server machine 30 via the first NIC 50a (No in Step S101).

On the other hand, if the transmission direction of the packet identified by the exchanging function 52 in the direction decision subroutine is "downlink" (No in Step S106), the mirroring function 54 performs a mirroring process of the packet transmitted from the exchanging function 52 to the web application server machine 30 after the source IP address and the destination IP address are exchanged (Step S108). In other words, the mirroring function 54 copies the packet and sends out the copy to the NIC 90a of the communication state visualizing machine 90 via the second NIC 50b. After sending out, the process becomes the state of waiting for the packet receiving function 51 to receive the packet from the third NIC 30c of the web application server machine 30 via the first NIC 50a (No in Step S101).

[Actions and Effects]

Figure 10:
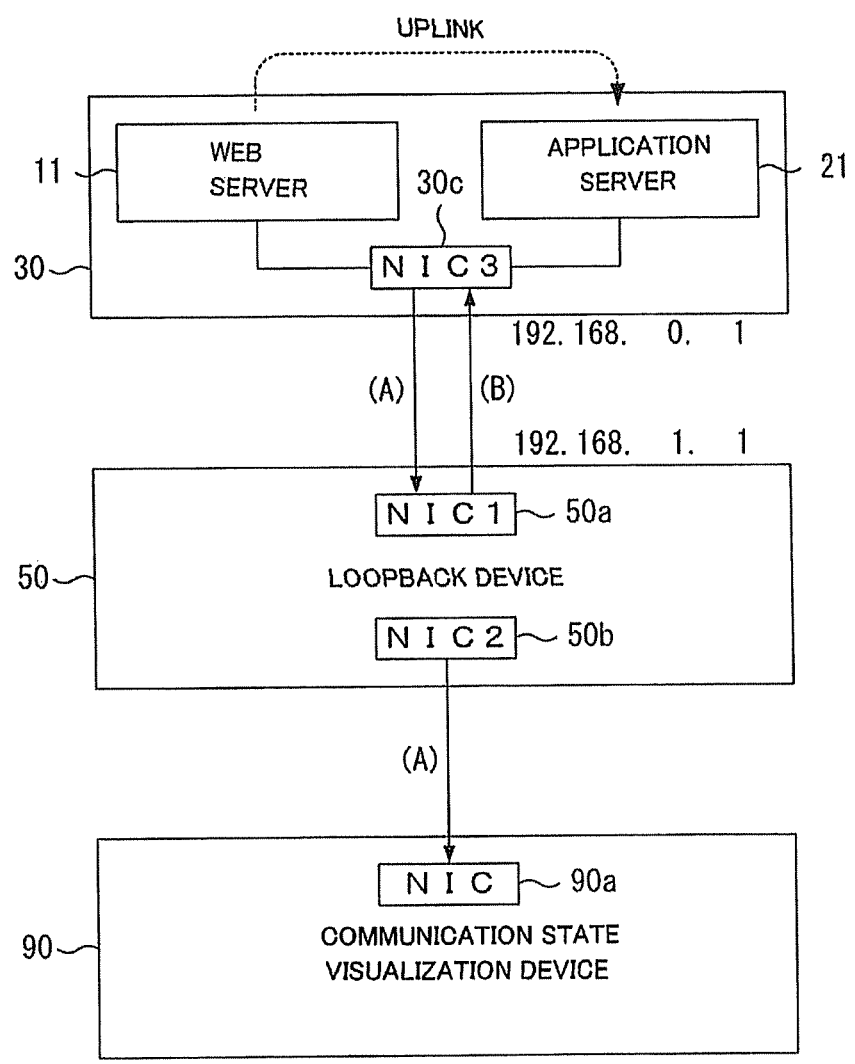
FIG. 10 is a diagram illustrating communication of packets when a transmission direction is uplink.
Figure 11:
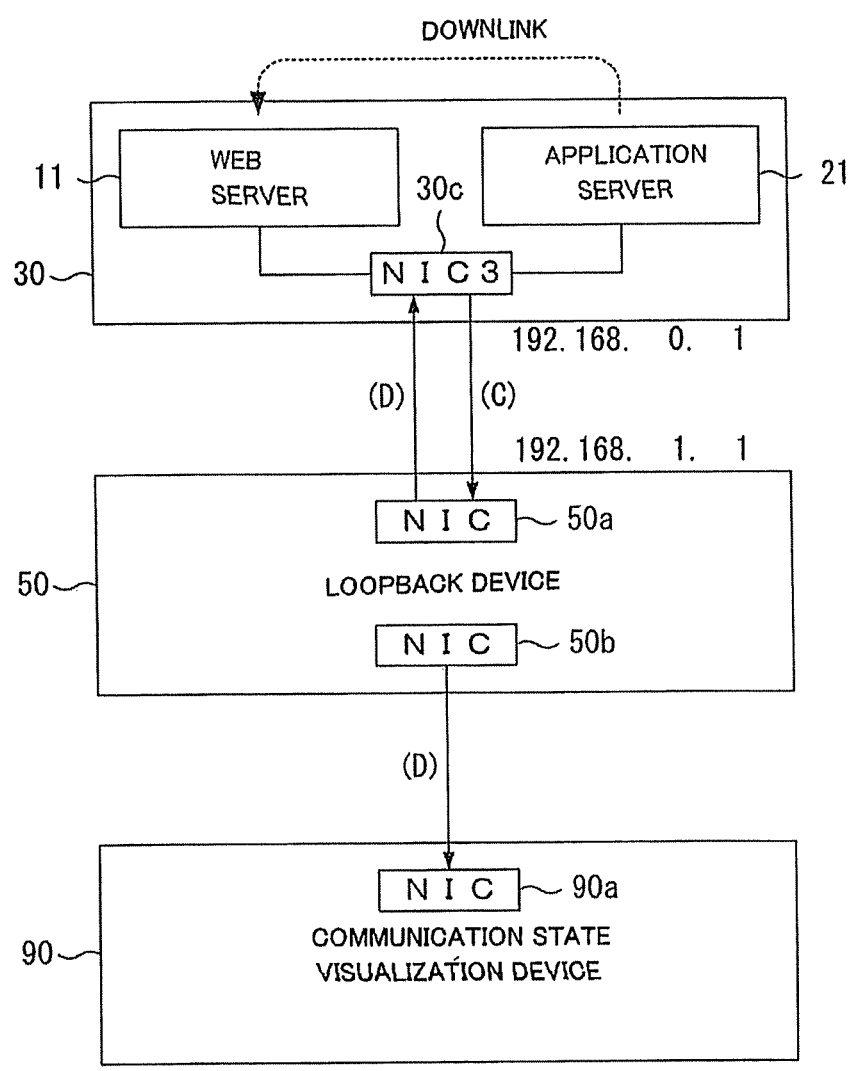
FIG. 11 is a diagram illustrating communication of packets when the transmission direction is downlink.

FIGS. 10 to 12 are diagrams that are used for describing actions and effects of the loopback device 50 according to this embodiment. Among those, FIG. 10 illustrates a state of transmitting the IIOP message from the web server 11 to the application server 21 (uplink), and FIG. 11 illustrates a state of transmitting the IIOP message from the application server 21 to the web server 11 (downlink). FIG. 12 is a table showing the IP address and the port number of each packet communicated in the uplink transmission and in the downlink transmission among the web application server machine 30, the loopback device 50, and the communication state visualizing machine 90.

Here, for description, it is supposed that the IP address assigned to the third NIC 30c of the web application server machine 30 is "192.168. 0. 1" and that the IP address assigned to the first NIC 50a of the loopback device 50 is "192.168. 1. 1". In addition, it is supposed that the port number assigned to the IIOP-I/F 12b on the lower level of the web server 11 is "50000" and that the port number assigned to the IIOP-I/F 22a on the lower level of the application server 21 is "1000".

In the example illustrated in FIGS. 10 to 12, a packet (A) having the source IP address, the destination IP address, the source port number, and the destination port number that are "192.168. 0. 1", "192.168. 1. 1", "50000", and "1000", respectively, is transmitted from the third NIC 30c of the web application server machine 30 to the first NIC 50a of the loopback device 50 in the uplink transmission that is the IIOP message transmission from the web server 11 to the application server 21.

Further, after receiving the packet (A), the loopback device 50 generates a packet (B) in which the source IP address and the destination address are exchanged from those in the packet (A) as illustrated in Step S103 of FIG. 7 and in FIG. 12. Then, the packet (B) is transmitted from the first NIC 50a of the loopback device 50 to the third NIC 30c of the web application server machine 30.

In addition, the loopback device 50 transmits the packet (A) from the second NIC 50b of the loopback device 50 to the NIC 90a of the communication state visualizing machine 90 as illustrated in Step S107 of FIG. 7.

On the other hand, in the downlink transmission that is the IIOP message transmission from the application server 21 to the web server 11, a packet (C) having the source IP address, the destination IP address, the source port number, and the destination port number that are "192.168. 0. 1", "192.168. 1. 1", "1000", and "50000", respectively, is transmitted from the third NIC 30c of the web application server machine 30 to the first NIC 50a of the loopback device 50.

Here, when comparing the packet (A) with the packet (C), it is found that the source port number and the destination port number are exchanged. Therefore, once a combination of the source port number and the destination port number in the uplink transmission is registered in the connection table 55 of FIG. 6 as illustrated in Step S209 of FIG. 9, a transmission direction of a packet that is received thereafter can be decided in accordance with a combination of the source port number and the destination port number of the packet as illustrated in Steps S201 to S208 of FIG. 9.

Further, after receiving the packet (C), the loopback device 50 generates a packet (D) in which the source IP address and the destination address are exchanged from those of packet (C) as illustrated in Step S103 of FIG. 7 and in FIG. 12. Then, the packet (D) is transmitted from the first NIC 50a of the loopback device 50 to the third NIC 30c of the web application server machine 30.

In addition, the loopback device 50 transmits the packet (D) from the second NIC 50b of the loopback device 50 to the NIC 90a of the communication state visualizing machine 90 as illustrated in Step S108 of FIG. 7.

In this way, according to this embodiment, the IIOP message communicated between the pair of servers 11 and 21 which have layers adjacent to each other and are incorporated in the same machine 30 is not communicated locally in the machine 30 but is communicated via the loopback device 50 outside the machine 30. In addition, the packet carrying the IIOP message is copied by the loopback device 50 and is delivered to the communication state visualizing machine 90.

Further, in the process illustrated in FIG. 7, if the transmission direction of the received packet is "uplink", the received packet is mirrored. If the transmission direction of the received packet is "downlink", the packet in which the IP addresses are exchanged is mirrored. In other words, in the process, the packet (A) and the packet (D) are mirrored as illustrated in FIGS. 10 to 12. However, the process illustrated in FIG. 7 may be performed in the opposite manner.

More specifically, if the transmission direction of the received packet is "uplink", the packet in which the IP addresses are exchanged may be mirrored. If the transmission direction of the received packet is "downlink", the received packet may be mirrored. In this case, the process is performed for mirroring the packets (B) and (C) in FIGS. 10 to 12.

With the configuration disclosed above, the message that is communicated between the pair of servers that belong to neighboring layers and are incorporated in the same machine is not communicated locally in the machine but communicated via the loopback device disposed on the outside of the machine. In addition, the packet carrying the message is copied by the loopback device and passed to the communication state visualizing machine.

According to the mirroring method disclosed above, communications of messages performed by every server constituting the multi-tier system can be visualized even if a pair of servers in neighboring layers among the plurality of servers constituting the multi-tier system are incorporated in the same machine.

[Modified Example]

The processing of the embodiment described above is provided as a computer-executable program, and can be provided by a recording medium such as a CD-ROM or a flexible disk or via a communication line.

An arbitrary plurality of or all the processes of the embodiment described above can be selected and combined to be carried out.

What is claimed is:

1. A loopback device of mirroring a packet for a system visualization machine that analyzes packets flowing between servers in a multi-tier system so as to visualize transactions between the servers, comprising:
    a storage unit that stores a transmission source address, a transmission source port, and a transmission destination port;
    a reception unit that receives a packet including a transmission source address, a transmission source port, and a transmission destination port from one of target servers performing functions of two or more tiers;
    an exchange unit that exchanges the transmission source address and a transmission destination address of the received packet;
    a transmission unit that transmits the packet in which the addresses are exchanged to another of the target servers; and
    a mirroring processing unit that copies one of the received packet and sends the copy packet to the system visualization machine via an interface other than an interface connected with the servers.

2. The loopback device according to claim 1, wherein:
    if the transmission source address, the transmission source port, and the transmission destination port of the received packet match the transmission source address, the transmission source port, and the transmission destination port in the storage unit, the exchange unit decides that the received packet is an up direction;
    if not match, the transmission source port and the transmission destination port of the received packet are exchanged, and if the transmission source address of the received packet and the transmission source port and the transmission destination port after exchanging match the transmission source address, the transmission source port, and the transmission destination port in the storage unit, the exchange unit decides that the received packet is a down direction; and
    the mirroring processing unit performs mirroring of the received packet if the received packet is the up direction and performs mirroring of the exchanged packet if the received packet is the down direction, so as to send the mirrored packet to the system visualization machine.

3. The loopback device according to claim 1, wherein if the transmission source address, the transmission source port, and the transmission destination port of the received packet do not exist in the storage unit, the exchange unit decides that the received packet is for a new connection, so that the transmission source address, the transmission source port, and the transmission destination port of the received packet are recorded in the storage unit.

4. The loopback device according to claim 1, wherein the target servers are a pair of servers that belong to neighboring layers and are incorporated in the same machine among a plurality of servers constituting the multi-tier system.

5. A mirroring method executed by a loopback device of mirroring a packet for a system visualization machine that analyzes packets flowing between servers in a multi-tier system so as to visualize transactions between the servers, the mirroring method comprising:
    receiving a packet including a transmission source address, a transmission source port, and a transmission destination port from one of target servers performing functions of two or more tiers;
    exchanging the transmission source address and a transmission destination address of the received packet;
    transmitting, to another of the target servers, the packet in which the addresses are exchanged;
    copying one of the received packet; and
    sending the copy packet to the system visualization machine via an interface other than an interface connected to the servers.

6. The mirroring method according to claim 5, wherein:
    if the transmission source address, the transmission source port, and the transmission destination port of the received packet match the transmission source address, the transmission source port, and the transmission destination port in the storage unit, the exchanging decides that the received packet is an up direction;
    if not match, the transmission source port and the transmission destination port of the received packet are exchanged, and if the transmission source address of the received packet and the transmission source port and the transmission destination port after exchanging match the transmission source address, the transmission source port, and the transmission destination port in the storage unit, the exchanging decides that the received packet is a down direction; and
    the mirroring processing performs mirroring of the received packet if the received packet is the up direction and performs mirroring of the exchanged packet if the received packet is the down direction, so as to send the mirrored packet to the system visualization machine.

7. The mirroring method according to claim 5, wherein if the transmission source address, the transmission source port, and the transmission destination port of the received packet do not exist in the storage unit, the exchanging decides that the received packet is for a new connection, so that the transmission source address, the transmission source port, and the transmission destination port of the received packet are recorded in the storage unit.

8. The mirroring method according to claim 5, wherein the target servers are a pair of servers that belong to neighboring layers and are incorporated in the same machine among a plurality of servers constituting the multi-tier system.

* * * * *